US012251586B2

(12) United States Patent
Walsh et al.

(10) Patent No.: US 12,251,586 B2
(45) Date of Patent: Mar. 18, 2025

(54) SAFETY ANCHOR APPARATUS

(71) Applicant: Anchor Ring Solutions, LLC, Pen Argyl, PA (US)

(72) Inventors: James R Walsh, Westport, CT (US); Joseph A. Fugallo, East Meadow, NY (US); John P. Marra, Bangor, PA (US)

(73) Assignee: Anchor Ring Solutions, LLC, Pen Argyl, PA (US)

( * ) Notice: Subject to any disclaimer, the term of this patent is extended or adjusted under 35 U.S.C. 154(b) by 1087 days.

(21) Appl. No.: 17/050,352

(22) PCT Filed: Apr. 24, 2019

(86) PCT No.: PCT/US2019/028886
§ 371 (c)(1),
(2) Date: Oct. 23, 2020

(87) PCT Pub. No.: WO2019/209929
PCT Pub. Date: Oct. 31, 2019

(65) Prior Publication Data

US 2021/0052924 A1 Feb. 25, 2021

Related U.S. Application Data

(63) Continuation of application No. 16/168,381, filed on Oct. 23, 2018, now Pat. No. 10,695,594.
(Continued)

(51) Int. Cl.
*E04G 21/32* (2006.01)
*A62B 35/00* (2006.01)

(52) U.S. Cl.
CPC ...... *A62B 35/0068* (2013.01); *E04G 21/3219* (2013.01); *E04G 21/3276* (2013.01)

(58) Field of Classification Search
CPC ............ A62B 35/0068; E04G 21/3219; E04G 21/3276; E04G 5/062; E04G 5/067
(Continued)

(56) References Cited

U.S. PATENT DOCUMENTS 3,309,828 A 3/1967 Tribble
3,550,343 A 12/1970 Buske
(Continued)

FOREIGN PATENT DOCUMENTS

DE 1759484 A1 9/1971
DE 2022595 A1 11/1971
(Continued)

*Primary Examiner* — Colleen M Chavchavadze
(74) *Attorney, Agent, or Firm* — Rowan Tree Law Group, PLLC; Joseph W. Schmidt

(57) ABSTRACT

A safety anchor apparatus is adapted for use in installation of a perimeter cable fall protection system at a construction site, e.g., involving concrete or masonry wall construction. The safety anchor apparatus may be mounted during construction of the masonry or cement block wall with relative ease and is capable of securing holding the support cable (e.g., steel cable) in a tensioned condition to meet all safety standards with regard to strength, load etc. The safety anchor apparatus is secured to embedded reinforcement bar extending through a column or rows of cement blocks. The safety anchor apparatus is selectively adjustable to accommodate masonry blocks of different sizes which may be used during construction of the support wall. Moreover, the safety anchor apparatus is adjustable to account for variations in wall design and readily deployable about the vertical reinforcement bar during application of the rows of cement blocks.

14 Claims, 12 Drawing Sheets

Related U.S. Application Data

(60) Provisional application No. 62/662,315, filed on Apr. 25, 2018.

(58) Field of Classification Search
USPC .................................................... 52/698, 703
See application file for complete search history.

(56) References Cited

U.S. PATENT DOCUMENTS 3,873,147 A * 3/1975 Annable ................. B66C 1/666 52/707
5,287,944 A * 2/1994 Woodyard .............. E04D 13/12 248/237
5,323,813 A * 6/1994 Barrett .................... F16L 27/12 138/155
5,699,748 A 12/1997 Linskey, Jr. et al.
5,799,602 A 9/1998 Trillo et al.
6,023,894 A 2/2000 Sorkin
6,092,849 A * 7/2000 Zambelli ................. B66C 1/666 52/707
6,412,230 B1 * 7/2002 Zambelli ............. E04G 21/3261 52/27
7,137,609 B2 * 11/2006 Sack ................. B29C 45/14073 249/91
7,418,913 B2 * 9/2008 Dowd ..................... B63B 21/00 114/230.17
7,469,511 B2 12/2008 Wobber
7,516,591 B2 4/2009 Wolner et al.
7,654,057 B2 * 2/2010 Zambelli ............... E04B 1/4107 52/704
7,905,063 B2 * 3/2011 Kelly ...................... B66C 1/666 52/707
8,122,663 B1 2/2012 Hohmann, Jr. et al.
8,726,596 B2 5/2014 Hohmann, Jr.
8,726,597 B2 5/2014 Hohmann, Jr.
8,839,581 B2 9/2014 Hohmann, Jr. et al.
8,851,801 B2 10/2014 Barrett et al.
9,003,715 B2 * 4/2015 Nurdogan ................. E04D 1/30 52/749.12
9,387,351 B2 * 7/2016 Auston .............. A62B 35/0068
10,384,085 B1 * 8/2019 Aleksovski ........ A62B 35/0068
10,526,805 B2 * 1/2020 Gurtler .............. A62B 35/0068
10,695,594 B2 * 6/2020 Walsh ................. E04G 21/3276
2005/0044809 A1 * 3/2005 Thompson ............ E04B 1/4114 52/223.13
2005/0097849 A1 5/2005 Hayes
2008/0042029 A1 * 2/2008 Reeves ............... E04G 21/3276 248/231.91
2009/0302289 A1 * 12/2009 Simmons ............ E04G 21/3219 256/32
2009/0320386 A1 * 12/2009 Mackay Sim ........ E04B 1/4121 52/125.4
2010/0213004 A1 * 8/2010 Petty .................. A62B 35/0068 182/5
2011/0309071 A1 * 12/2011 Lin ........................ H02G 3/088 285/151.1
2012/0067668 A1 3/2012 Rico
2012/0117913 A1 * 5/2012 Melic .................. E04G 21/3276 52/703
2012/0222370 A1 * 9/2012 Crookston .......... E04G 21/3276 52/173.1
2012/0285111 A1 11/2012 Johnson, III
2015/0367152 A1 12/2015 Borchardt
2016/0145862 A1 * 5/2016 Abbas ....................... E04C 3/34 52/218
2016/0296774 A1 10/2016 Ostrobrod et al.
2017/0319907 A1 * 11/2017 Crawford .............. F16B 45/023
2023/0327347 A1 * 10/2023 Ritchie .................... H01R 4/56 52/173.1

FOREIGN PATENT DOCUMENTS

DE 19959858 A1 6/2001
WO PCT/US2019/028886 12/2021

* cited by examiner

SAFETY ANCHOR APPARATUS

BACKGROUND

Technical Field

The present disclosure relates to a safety apparatus, and, in particular, relates to a safety anchor apparatus adapted for use in installation of a perimeter cable fall protection system during a construction phase of a building structure.

Background of Related Art

Perimeter restraint wire rope and/or cable systems are utilized in the construction of multi-story structures to provide fall protection for construction personnel during operation and movement about the construction site. These systems must meet OSHA safety standards with respect to location, strength, load support, anchorage etc. Conventional methodologies utilize multiple brackets, posts, fences and additional anchorage mechanisms which must be individually installed relative to the building structure. Although these conventional devices are generally acceptable for their intended uses, the multiple components and anchorage systems are expensive, cumbersome to work with, and require additional time for installation and removal. In addition, some of these devices are not adaptable to concrete masonry wall construction.

SUMMARY

Accordingly, the present disclosure is directed to a safety anchor apparatus adapted for use in installation of a perimeter cable fall protection system at a construction site, e.g., involving concrete or masonry wall construction. The safety anchor apparatus may be mounted during construction of the masonry or cement block wall with relative ease and is capable of securing holding the safety cable (e.g., steel cable) in a tensioned condition to meet all safety standards with regard to strength, load etc. The safety anchor apparatus is secured to embedded reinforcement bar extending through a column or rows of cement blocks. The safety anchor apparatus is selectively adjustable to accommodate masonry or cement blocks of different sizes which may be used during construction of the support wall. Moreover, the safety anchor apparatus is adjustable to account for variations in wall design and readily deployable about the vertical reinforcement bar during application of the rows of cement blocks. Upon completion, the safety anchor apparatus may remain embedded in the wall.

In one embodiment, a safety anchor system includes a safety anchor having a tube body defining an opening therethrough for reception and passage of a safety cable and having opposed tube end segments, a sleeve coaxially mounted over each tube end segment of the tube body and an end plug releasably mountable to each sleeve. The tube body is configured to be positioned about a length of reinforcement bar extending through a masonry wall structure. The sleeves are each reciprocally movable between a retracted position and an extended position to facilitate positioning ends of the sleeves relative to a face of the masonry wall structure. The end plugs are configured to engage a face of the masonry wall structure upon reciprocal movement of the sleeves.

In some embodiments, the tube body defines an arcuate shape configured to wrap about the length of reinforcement bar. In certain embodiments, the tube body is U-shaped.

In embodiments, the end plugs each include insertion segments. The insertion segments of the end plugs are at least partially positionable within respective sleeves. In some embodiments, the end plugs each defines an outer shelf configured to engage the face of the masonry wall structure during reciprocal movement of the sleeves to arrange the ends of the sleeves to be substantially coterminous with the face of the masonry wall structure.

In certain embodiments, the tube end segments of the tube body each include an outer collar configured to engage an inner ledge of each of the respective sleeves to retain the sleeves on the tube body.

In some embodiments, a safety cable is provided. The safety cable extends through the opening of the tube body and through the sleeves when the end plugs are removed from the respective sleeves. The safety cable may be a component of a safety fence.

In embodiments, at least one cable clamp is provided. The at least one cable clamp is configured for securing segments of the cable extending outwardly from the sleeves.

In another exemplary embodiment, a method is disclosed. The method includes coupling a tube body of a safety anchor apparatus about a length of reinforcement bar extending through a masonry wall structure, passing a safety cable through the tube body and securing a first cable segment of the safety cable extending from one tube end segment of the tube body to a second cable segment of the safety cable extending from another tube end segment of the tube body. In embodiments, the tube body defines an arcuate configuration and wherein coupling the tube body includes hooking the tube body about the length of reinforcement bar.

In some embodiments, the method includes mounting a sleeve about each of the tube end segments of the tube body and moving the sleeves relative to the tube end segments such that ends of the sleeves are substantially coterminous with the masonry wall structure. In certain embodiments, an end plug is positioned within each of the tube end segments of the tube body prior to passing the safety cable and wherein moving the sleeves includes arranging the sleeves such that an outer shelf of each end plug engages a face of the masonry wall structure.

In embodiments, the method includes securing the safety anchor within the masonry wall structure. In some embodiments, the masonry wall structure includes a plurality of vertically stacked rows of masonry or cement blocks and including arranging the masonry blocks such that the reinforcement bar extends through vertically aligned cavities of the masonry blocks. In some embodiments, securing the safety anchor includes depositing cement or mortar through the vertically aligned cavities of the masonry blocks. In certain embodiments, the safety anchor apparatus is positioned between masonry blocks of a first set of adjacent rows of the masonry blocks. In embodiments, at least one additional safety anchor apparatus is positionable between masonry blocks of a second or upper set of adjacent rows of the masonry blocks.

In embodiments, the method includes coupling a second tube body of a second safety anchor apparatus about a second length of reinforcement bar extending through a second masonry wall structure where the second masonry wall structure is spaced from the first-mentioned masonry wall structure, extending the second cable segment of the safety cable to the second masonry wall structure, passing the second cable segment through the second tube body, and securing the second cable segment extending from tube end segments of the second tube body to itself to thereby create a safety fence line extending between the first and second masonry wall structures. A safety net may be coupled to the safety fence line. In some embodiments, the method includes tensioning the second end segment of the safety cable prior to securing the second cable segment to itself.

In certain embodiments, each of the first and second wall masonry wall structures includes vertically stacked rows of masonry or cement blocks, and including positioning the safety anchor apparatus between masonry blocks of adjacent rows of the masonry blocks of the first masonry wall structure and positioning the second safety anchor apparatus between adjacent rows of the masonry blocks of the second masonry wall structure.

Other advantages of the present disclosure will be appreciated from the following description.

BRIEF DESCRIPTION OF THE DRAWINGS

Various embodiments of the present disclosure are described hereinbelow with reference to the drawings wherein.

DETAILED DESCRIPTION

Figure 2:
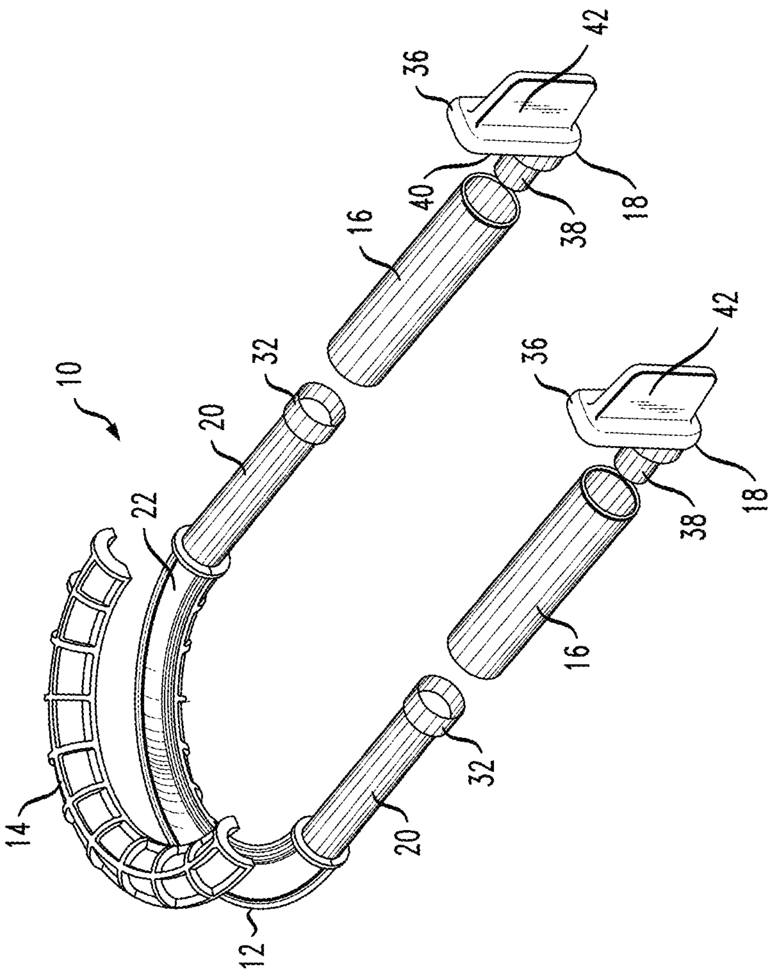
FIG. 2 is an exploded perspective view of the safety anchor apparatus illustrating the tube body, the sleeves, the tube cap and end plugs.
Figure 1:
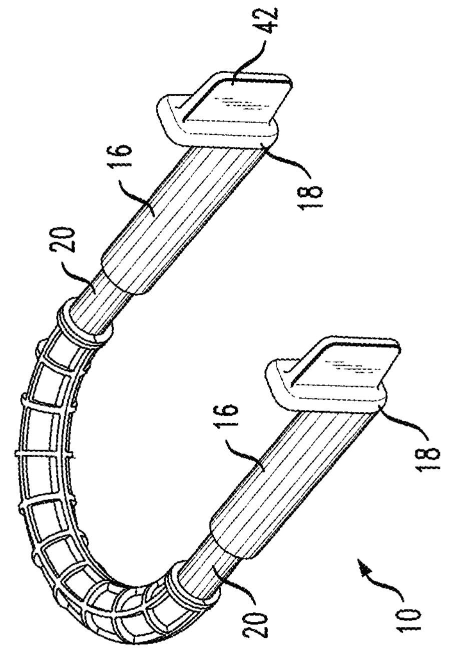
FIG. 1 is a perspective view of the safety anchor apparatus.
Figure 4:
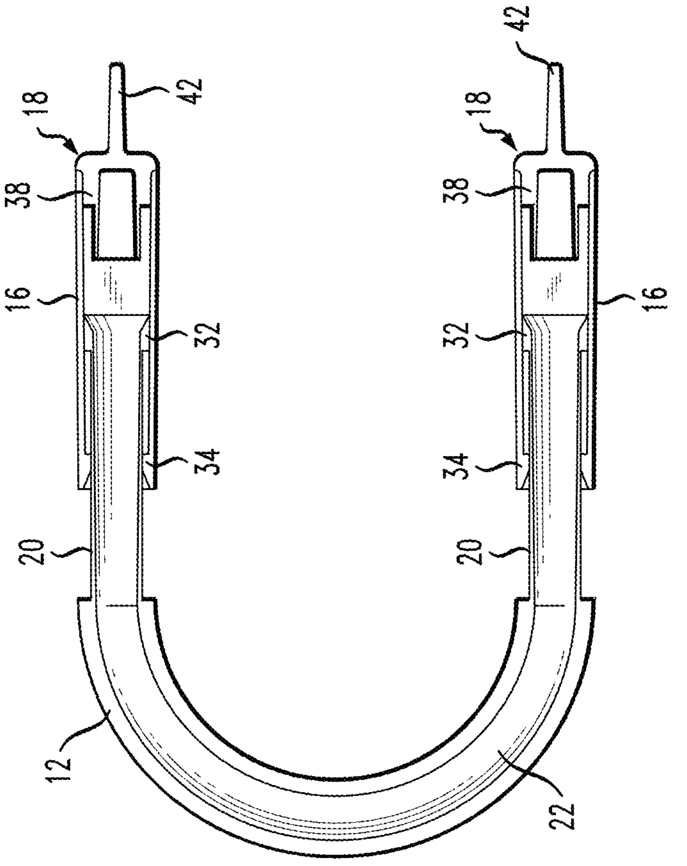
FIG. 4 is a cross-sectional view of the safety anchor apparatus.
Figure 3:
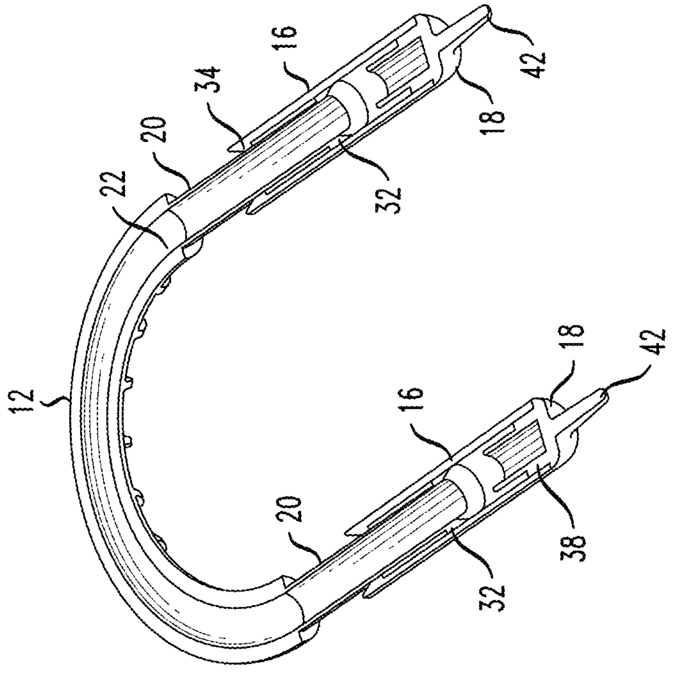
FIG. 3 is a perspective view in cross-section of the safety anchor apparatus.
Figure 5:
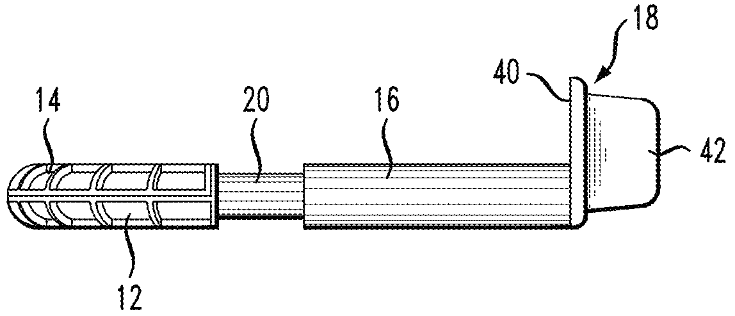
FIG. 5 is a side elevation view of the safety anchor apparatus.

Particular embodiments of the present disclosure are described hereinbelow with reference to the accompanying drawings. However, it is to be understood that the disclosed embodiments are merely examples of the disclosure and may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to employ the present disclosure in virtually any appropriately detailed structure.

The safety anchor apparatus is an adjustable safety anchor system for use with, e.g., masonry or cement block construction of various sizes including but not limited to, 8", 10" and 12" block sizes. Although the present disclosure will be discussed in its application with concrete block construction, it is appreciated that the safety anchor apparatus may be used with various masonry construction materials, including, but, not limited to, brick, building stone such as marble, granite, travertine, and limestone, cast stone, glass block, and adobe and/or wood construction materials.

With initial reference to FIGS. 1-5, the apparatus 10 includes a tube body 12 and a tube cap 14, together defining a general U-shaped configuration, two substantially linear sleeves 16 and two end plugs 18. The tube body 14 has tube end segments 20, which are generally linear in configuration, about which the sleeves 16 are mounted. The tube body 14 in combination with the tube cap 14 defines a passage 22 therethrough for reception and passage of a safety cable, e.g., a steel cable.

Figure 6:
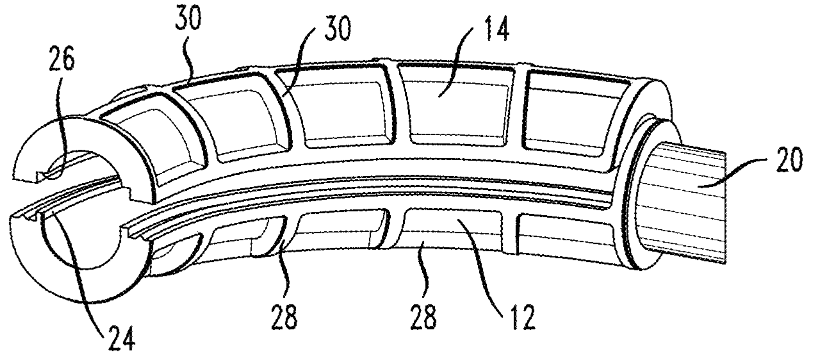
FIG. 6 is an isolated view of segments of the tube body and the tube cap illustrating an exemplary mounting mechanism for coupling the tube body and the tube cap.

As best depicted in FIG. 6, in conjunction with FIGS. 1-5, the tube cap 14 is secured to the tube body 12 through conventional means. In one methodology, the tube body 12 defines a rib 24 extending from, and along, its outer wall. The tube cap 14 includes a channel 26 in its outer wall cooperatively dimensioned to receive the rib 24 of the tube body 12 to couple the components. In some embodiments, the rib 24 of the tube body 12 and the channel 26 of the tube cap 14 establish a snap fit relation. In addition, or in the alternative, the tube cap 14 may be secured to the tube body 12 via the use of ultrasonic welding, adhesives, cements, etc. The tube body 12 and the tube cap 14 may be separate components manufactured via an injection molding process, and then joined to create a single, sealed U-shaped tube part as shown. In the alternative, the tube body 12 and the tube cap 14 may be a single component monolithically formed via, e.g., an injection molding process. The tube body 12 with the exception of the tube end segments 20 and the tube cap 14 may include longitudinal and orthogonal splines or ribs 28, 30 on their respective outer surfaces. The splines 28, 30 may be dimensioned to facilitate engagement by the user or assisting securing the safety anchor apparatus 10 about the reinforcement bar.

Figure 7A:
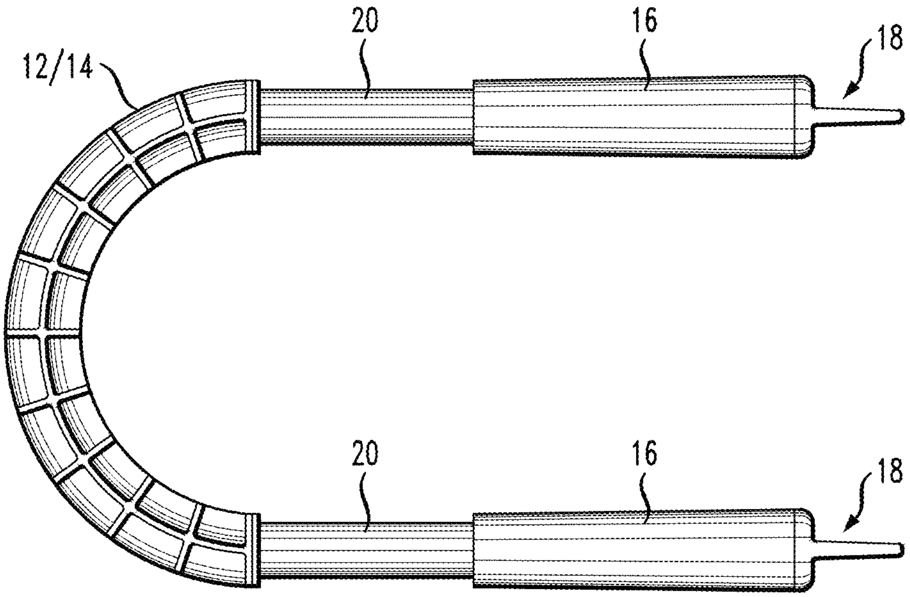
FIGS. 7A-7B are top plan and cross-sectional views respectively of the safety anchor apparatus illustrating the sleeves in an extended position relative to the tube body.
Figure 7B:
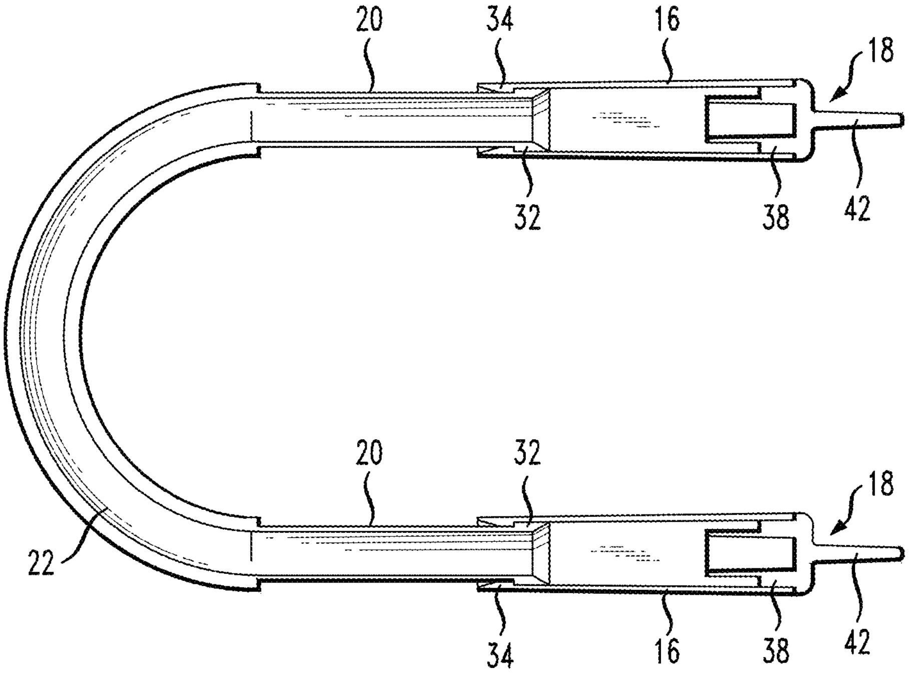
Figure 8A:
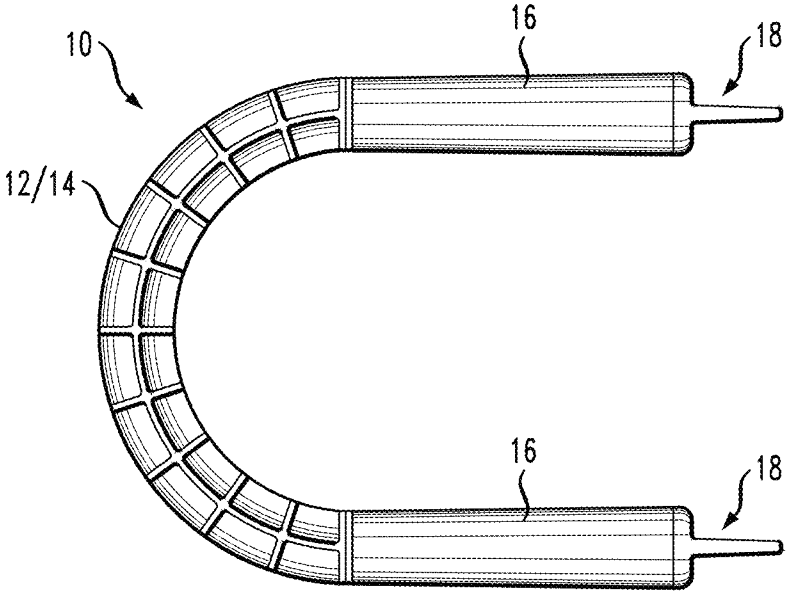
FIGS. 8A-8B are top plan and cross-sectional views respectively of the safety anchor apparatus illustrating the sleeves in a retracted position relative to the tube body.
Figure 8B:
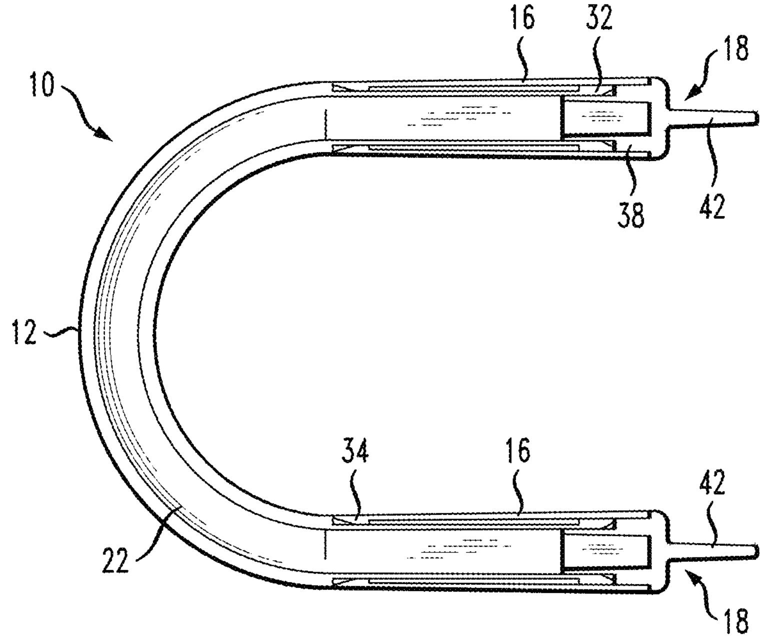
Figure 9:
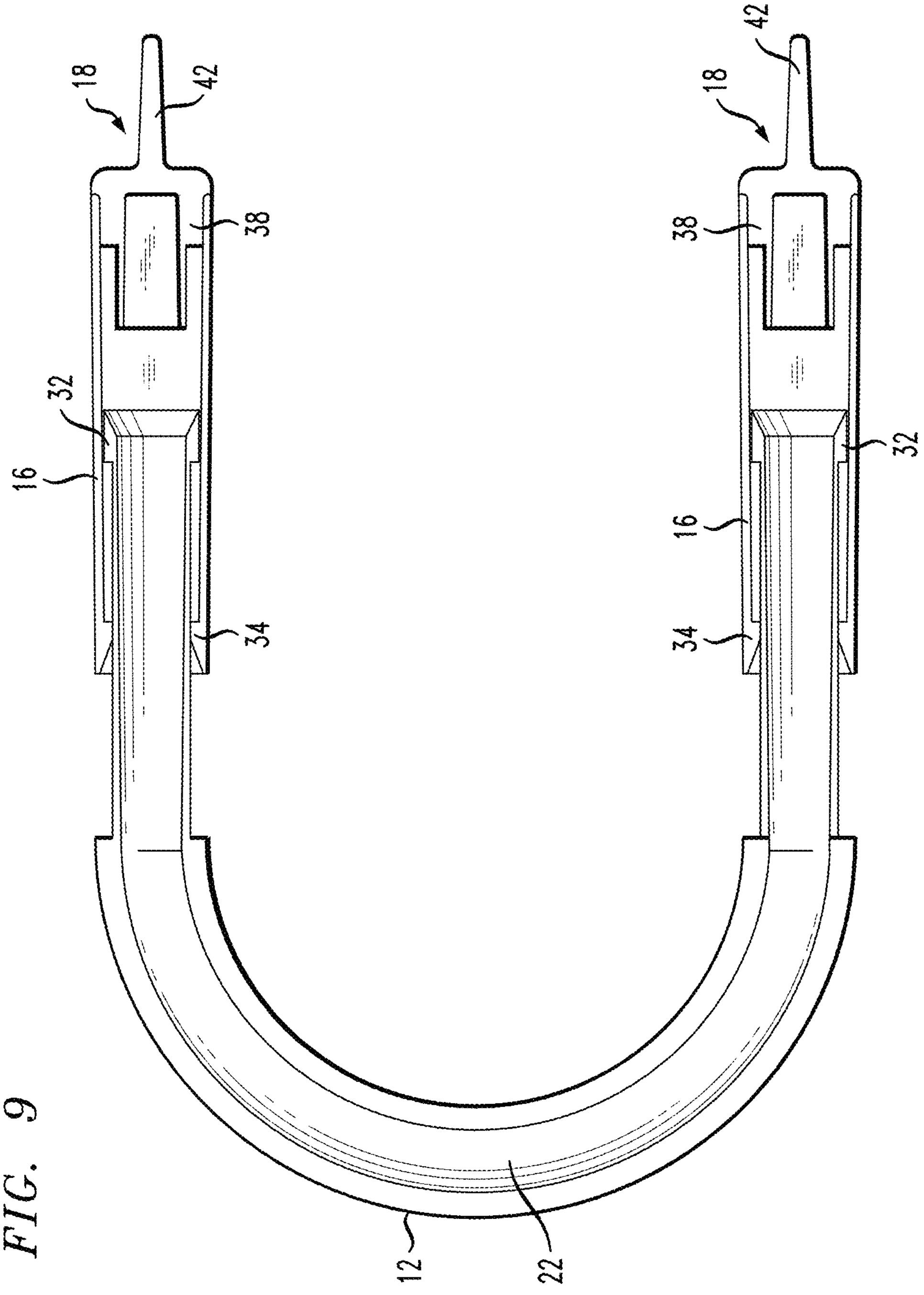
FIG. 9 is a cross-section view of the safety anchor apparatus illustrating the sleeves in an intermediate position relative to the tube body.

With reference again to FIGS. 1-5, the sleeves 16 may also be molded separately and forced into place over the end collars 32 of the tube end segments 20 of the tube body 12. Locking features of the sleeves 16 and tube body 12 will prevent the components from being separated. In one exemplary embodiment, the sleeves 16 each include an internal annular ledge or detent 34 which engages the outer collar 32 of the tube end segments 20 of the tube body 12 preventing the sleeves 16 from sliding off the tube body 12. The sleeves 16 are adapted to reciprocally move along the tube end segments 20 of the tube body 12 between a fully extended position (FIGS. 7A-7B), a fully retracted position (FIGS. 8A-8B) and a plurality of intermediate positions (one being depicted in FIG. 9) between the extended and retracted positions. This provides flexibility permitting usability of the apparatus 10 with different size cement blocks and/or by enabling the apparatus 10 to engage the vertical reinforcement bar "r" even if the reinforcement bar "r" is off-center with respect to the center of the cement block.

With reference again to FIGS. 1-5, the end plugs 18 are dimensioned to be at least partially received within the openings of the sleeves 16. One exemplative function of the end plugs 18 is to engage the front face of the support wall structure, e.g., the face of the cement block, to align the ends of the sleeves 16 with the face of the wall structure whereby the ends of the sleeves 16 are coterminous with the face of the wall. This ensures that the safety anchor apparatus 10 is appropriately positioned within the wall structure and that the safety cable will be capable of entering and exiting through the safety anchor apparatus 10 and the wall structure. Each end plug 18 includes an outer shelf 36 and an insertion segment 38. The outer shelf 36 depends outwardly from the insertion segment 38 and is dimensioned to engage the face of the wall structure. The outer shelf 36 may have a planar face 40 which engages the wall structure and a grip segment 42 opposing the planar face 40. The grip segment 42 is cooperatively dimensioned to be engaged by the user to assist in insertion and removal of the end plugs 18. The insertion segments 38 are dimensioned to be received within the interior ends of the sleeves 16 with a slight interference to create, e.g., a frictional relationship between the components, to retain the end plugs 18 within the sleeves 16.

The nominal outside diameter of the safety anchor apparatus 10 is roughly ½" (e.g., the outer diameter of the sleeves 16 is approximately ½") and is designed to fit in a mortar gap (that is typically ⅝") of stacked cement blocks. The length of the safety anchor apparatus 10 with the sleeves in the fully extended position and the end plugs 18 mounted may range from 5 inches to 9 inches, and the width across the safety anchor apparatus 10 between the outer surfaces of the sleeves 16 may range from about 4 to 8 inches. Other sizes are also contemplated.

With reference to FIGS. 10A-10B and FIGS. 11-12, the purpose of the safety anchor apparatus 10 is to couple with the reinforcement bar "r" (e.g., REBAR) extending through hollow sections of the cement blocks "b" to serve as an anchor to which safety cable is secured including perimeter cable utilized in a perimeter fall protection system.

Figure 10B:
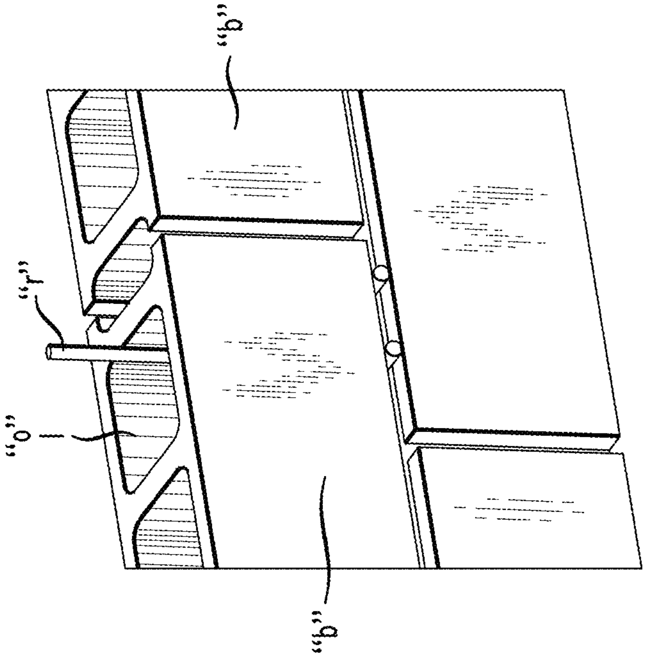
FIGS. 10A-10B are views depicting the safety anchor apparatus in accordance with the principles of the present disclosure mounted with respect to a masonry wall structure.
Figure 10A:
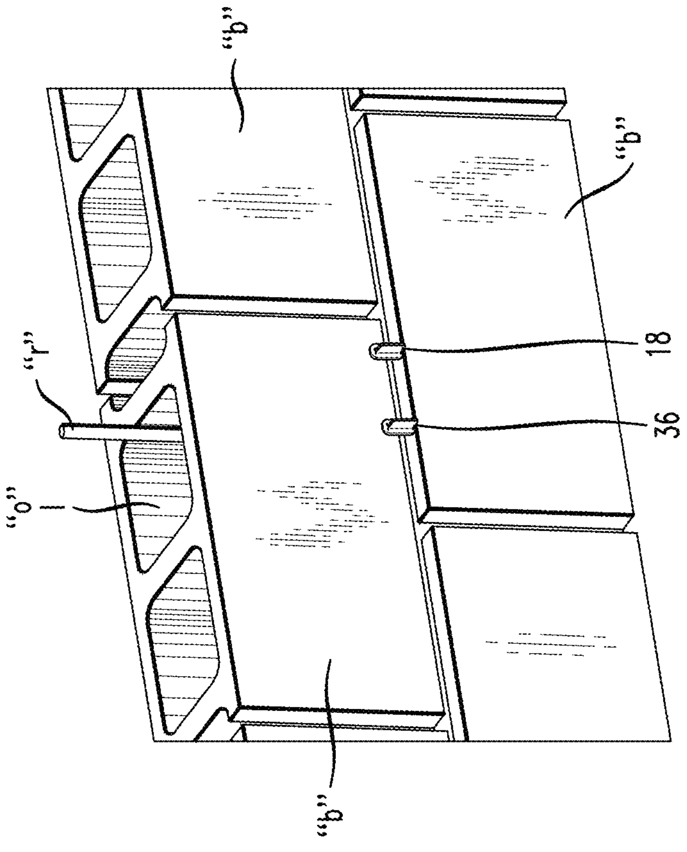
Figure 11:
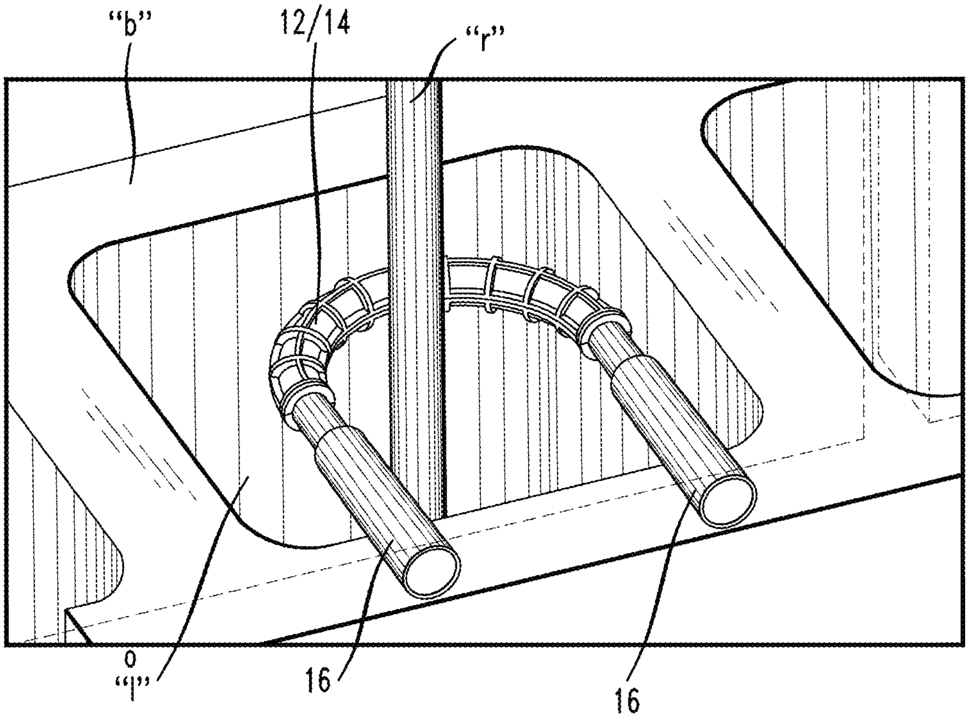
FIG. 11 is a perspective view illustrating placement of the safety anchor apparatus about a reinforcement bar extending through cavities of the masonry blocks of the masonry wall structure.
Figure 12:
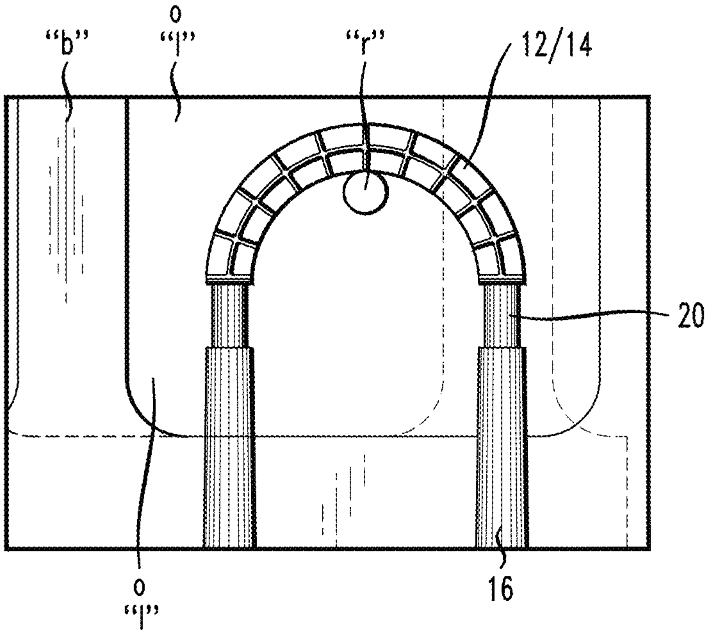
FIG. 12 is a top plan view further illustrating the safety anchor apparatus positioned about the reinforcement bar.

In one exemplary use, after the vertical reinforcement bars "r" are embedded in footing in the desired spaced relation, a row of cement blocks "b" for at least a portion of a first wall structure is laid on the footing with the reinforcement bars "r" extending through the internal cavities "i" of the cement blocks (FIGS. 11-12). Mortar will be applied to the top of the course of the cement blocks "b", and the assembled safety anchor apparatus 10 is placed around the reinforcement bar "r" embedded within the mortar. In embodiments, one assembled apparatus 10 is placed adjacent an outer block which will eventually define the perimeter of the wall construction. As noted hereinabove, the sleeves 16 are slidably mounted relative to the tube body 12 having a length adjustment of 1½" (although other ranges are contemplated), permitting the tube body 12 and the tube cap 14 to interface with and/or engage (e.g., in supporting relation therewith) the reinforcement bar "r" positioned from, e.g., 3½" to 5" from the front face of the block "b". As noted above, the sleeves 16 permit use of the safety anchor apparatus 10 with blocks of different sizes and/or when the reinforcement bar "r" is off center within the internal cavity of the block "b". The function of the end plug 18 is to position the open end of the sleeves 16 exactly flush with the front face of the blocks "b", and also to prevent mortar from entering the apparatus 10, including the sleeves 16 and the tube body 12, during installation. As discussed hereinabove, the outer shelf 36 of the end plugs 18 engages the front face of the cement block "b" providing confirmation that the end of the sleeve 16 is coterminous with the front surface of the cement block "b". (FIG. 10A). FIGS. 10A, 11 and 12 illustrate the end plugs 18 removed from the sleeves 16. After the safety anchor apparatus 10 is positioned in engagement with the reinforcement bar "r", additional mortar may be laid, and the next course or rows of cement block(s) will be placed over the safety anchor apparatus 10. An additional safety anchor apparatus 10 may be installed in the same manner on the next vertical row of cement blocks above the first positioned apparatus 10. Alternatively, at least one or more rows may be skipped and a safety anchor apparatus 10 installed on a select row about the reinforcement bar "r" in the same manner and vertically above or aligned with the previously installed anchor apparatus 10. Once the cement block wall structure is completed, mortar or cement is poured into the column surrounding the vertical reinforcement bar (within the vertical aligned cavities of cement block wall). The mortar or cement is permitted to cure securing the safety anchor apparatuses 10 in place about the safety anchor apparatus 10.

Figure 13:
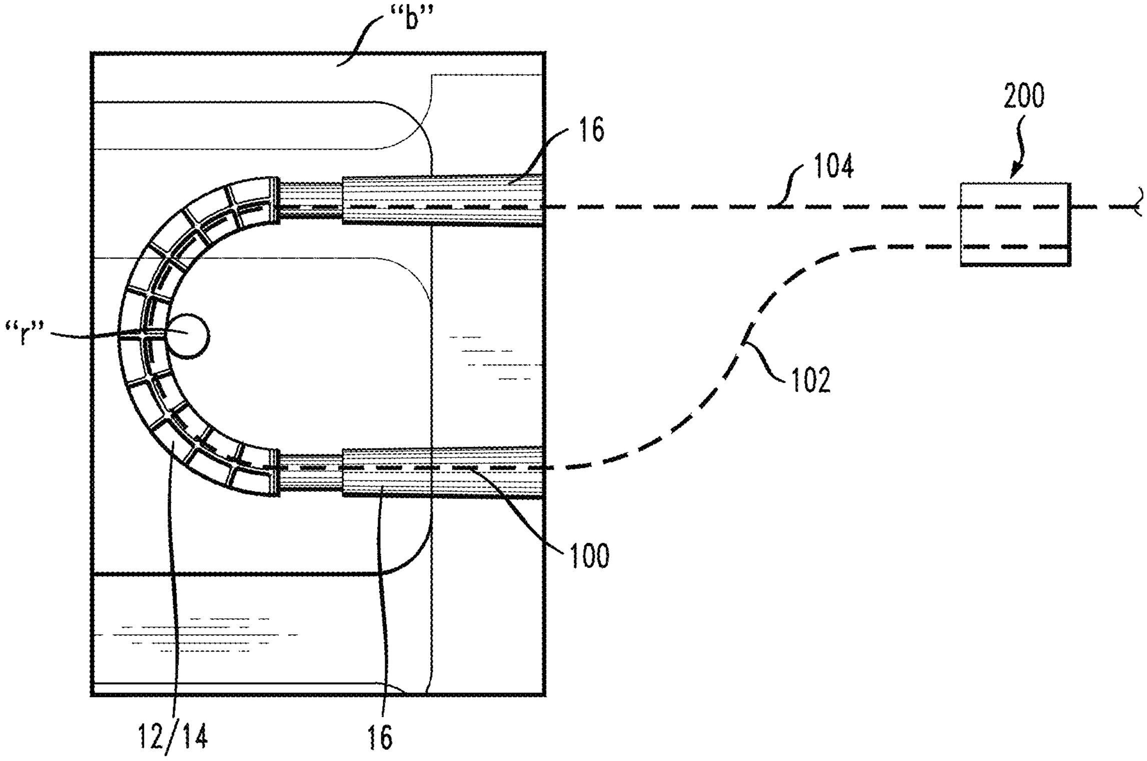
FIG. 13 is a view similar to the view of FIG. 12 illustrating a safety cable passed through the sleeves and the tube body and secured to establish a safety grip.
Figure 14:
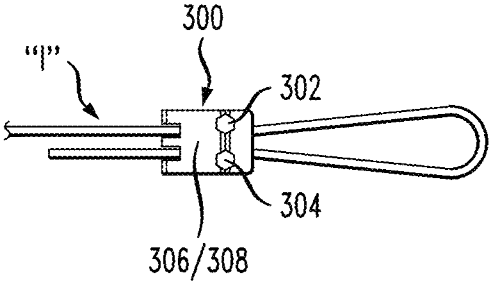
FIG. 14 is a view of an exemplative cable clamp which may be utilized to secure the safety cable upon itself.

With reference to FIG. 13, once the mortar or cement is cured, the end plugs 18 (if not already removed) are removed and a steel cable (e.g., ¼ steel cable) 100 (shown in phantom) is passed through the openings of the sleeves 16 and the tube body 12 and the tube cap 14 of each safety anchor apparatus 10. Internal design features permit the cable 20 to easily pass through the U-shaped bend of the tube body 12 and the tube cap 14 without snagging on any internal surfaces. In embodiments, the cable 100 is pulled through the safety anchor apparatus 10 to leave a small length cable segment 102 exiting one sleeve 16 and a larger length cable segment 104 exiting the opposed sleeve 16. The small cable segment 102 is secured to the larger cable segment 104 with a cable clamp, identified schematically as component 200. Any suitable clamp 200 adapted to secure lines of cable together in secured relation therewith may be utilized. For example, one suitable clamp for securing the safety cable segments 102, 104 is depicted in FIG. 14. This clamp 300 is disclosed in U.S. Pat. No. 6,842,949 to Warren, the entire contents of which are incorporated herein. The clamp 300 of Warren '949 incorporates a pair of bolts 302, 304 which can be tightened to cause a pair of plates 306, 308 to press down and secure the looped cable. Other clamp types are also envisioned.

Figure 15:
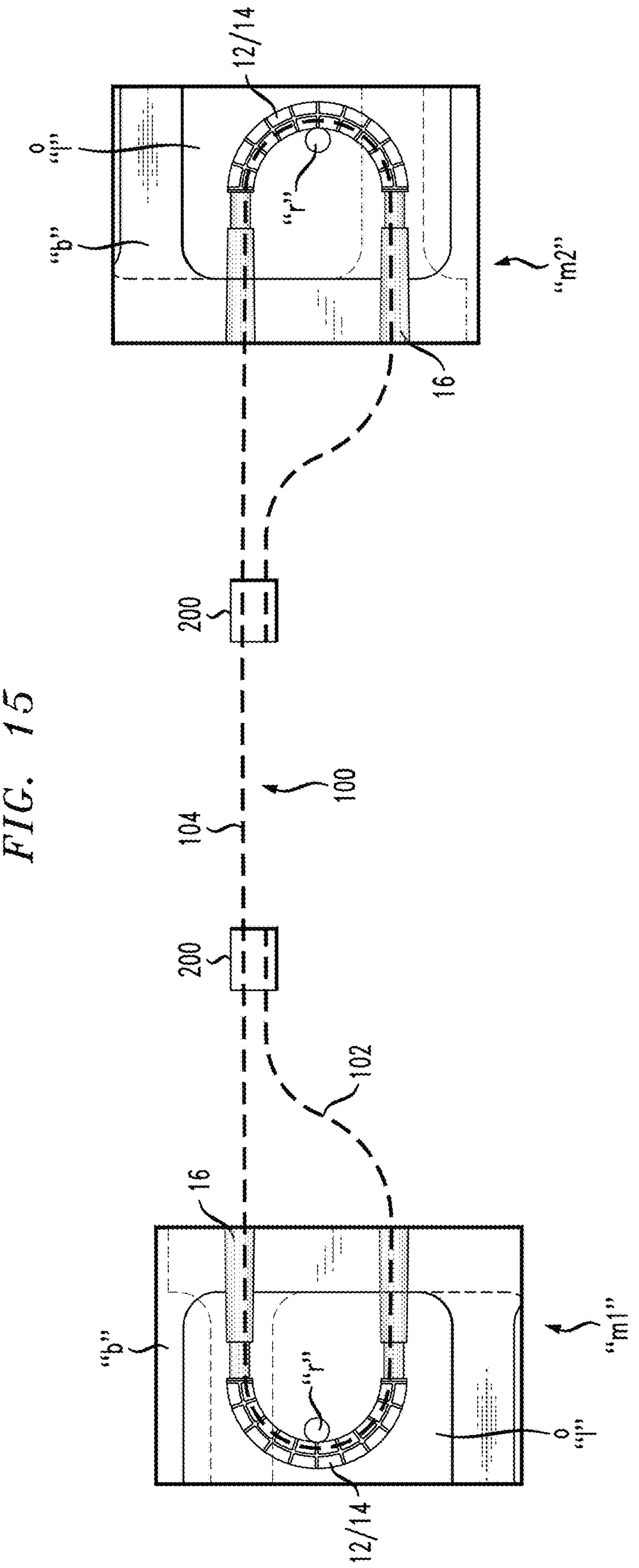
FIG. 15 is a view illustrating two opposed masonry wall structures each having at least one safety anchor secured therein and further illustrating the free end of the safety cable extended from the first support wall to the second support wall, passed through the second safety anchor apparatus in the second masonry wall and secured against itself with the cable clamp.
Figure 16:
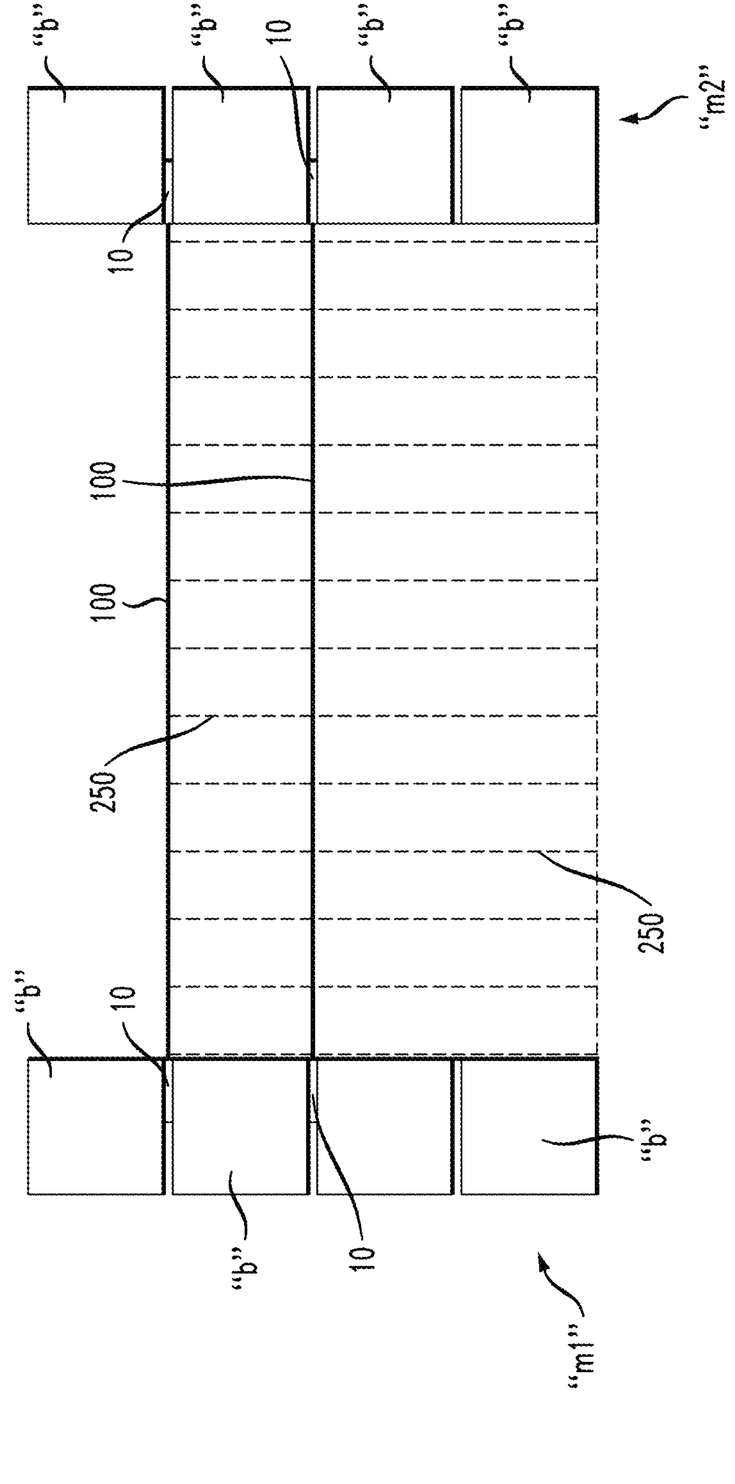
FIG. 16 is a view illustrating the safety cable extending between the first and second support walls and having a safety fence mounted thereto.

Construction of the remaining external walls of the structure is continued with the application of multiple rows of cement block and safety anchor apparatuses 10 selectively installed in the same manner discussed hereinabove. As best depicted in FIG. 15, when an opposing concrete or cement block of an opposing wall is completed, the remaining free or longer cable length 104 of the cable 100 secured to the apparatus(es) 10 of the first built wall portion or column "m1" is extended and passed through the openings of the sleeves 16 and the tube body 12 and the tube cap 14 of an opposing vertically aligned safety anchor apparatus 10 within the opposing wall portion "m2". The free end 104 is tensioned to a desired level and secured to the cable 100 with the use of a clamp 200 thereby establishing a cable barrier between the two walls, i.e., a safety cable for the perimeter of the building until the outer walls are completely installed. Multiple safety cables 100 may extend between the opposed cement block walls "m1", "m2" by passing a cable 100 between vertically aligned safety anchor apparatuses 10 of the opposing walls "m1", "m2". In general, safety cables may be located at 0", 20", 40", and 60" from the floor. Optionally, safety netting 250 may be secured to one or more of the cables 100 as depicted in FIG. 16. In FIG. 16, two opposing masonry walls "m1, m2" are depicted with two safety cables 100 extending between the masonry walls "m1, m2" and the netting 250 secured to the safety cables 100.

Upon completion of the outer walls, the cables 100 may be removed from each apparatus 10. Mortar may be optionally introduced or applied to cover the sleeve openings 16 flush with the face of the concrete wall with the apparatuses 10 remaining in the wall.

Figure 17:
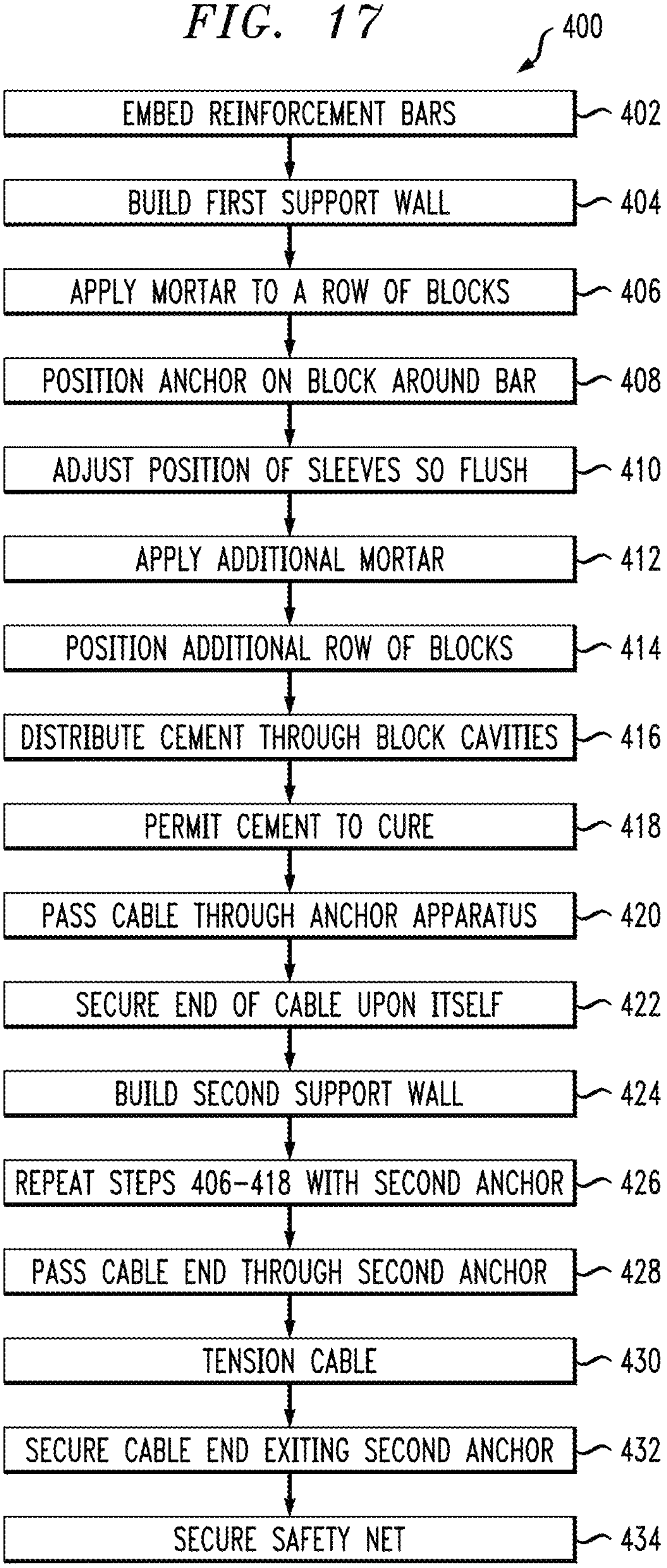
FIG. 17 illustrates one methodology of use of the safety anchor apparatus of the present disclosure.

The flow chart of FIG. 17 illustrates one methodology of use of the safety anchor apparatus 10 of the present disclosure. The methodology 400 includes embedding vertical reinforcement bars "r" within footing in desired spaced relation (STEP 402); building a first wall portion or column by positioning a first row of cement blocks "b" about the reinforcement bars "r" with the reinforcement bars "r" extending through select internal cavities "i" of the cement blocks "b" (STEP 404); applying mortar to the tops surfaces of the laid cement blocks "b" (STEP 406); positioning at least one or more safety anchor apparatuses 10 about the vertical reinforcement bars "r" (STEP 408); adjusting the positioning of the sleeves 16 relative to the tube body 12 and the tube cap 14 such that the ends of the sleeves 16 are flush with the forward face of the cement blocks (STEP 410); optionally applying additional mortar over the row of cement blocks "b" (STEP 412); positioning additional row(s) of cement blocks "b" over the first row while passing the vertical reinforcement bars "r" within aligned internal cavities "i" of vertically adjacent cement blocks "b" (STEP 414); pouring mortar or cement down the aligned vertical cavities "i" of the rows of cement blocks "b" and about the vertical reinforcement bars "r" (STEP 416); permitting the cement and mortar to cure (STEP 418); passing the safety cable 100 through the sleeves 16 and the tube body 12 (STEP 420) and securing one end portion 102 of the support cable 100 to the remaining portion 104 of the cable 100 (STEP 422); building a second wall portion or column in opposition to the first wall portion or column (STEP 424); repeating (STEPS 406-418) with at least one second anchor apparatus 10 (STEP 426); passing the free end of the safety cable through the second anchor apparatus in a vertically aligned safety anchor 10 in the second wall portion or column (STEP 428); tensioning the cable to a desired tension (STEP 430); securing the free end 104 of the cable 100 to the cable segment extending between the first and second wall portions to establish a safety cable barrier between the walls. (STEP 432). Optionally, securing a safety net to the safety cable barrier (STEP 434) to establish a safety net fall protection system. It is to be appreciated that the methodology 400 may eliminate or include additional STEPS and that the STEPS may be performed in a different sequence or order. In addition, multiple cables may be installed at different heights between the first and second opposing wall portions by repeating at least some of the STEPS. Furthermore, cables may be extended and secure between different opposing wall portions when constructed.

Although the illustrative embodiments of the present disclosure have been described herein with reference to the accompanying drawings, the above description, disclosure, and figures should not be construed as limiting, but merely as exemplifications of particular embodiments. For example, the safety anchor apparatus with the cable once installed in a masonry wall (before coupling to the opposing wall) may also serve as a temporary support for holding equipment or as a safety grip to permit movement of personnel about the construction site. It is to be understood, therefore, that the disclosure is not limited to those precise embodiments, and that various other changes and modifications may be effected therein by one skilled in the art without departing from the scope or spirit of the disclosure.

What is claimed is:

1. A safety anchor apparatus, which comprises:

a body configured to be positioned about a support element disposed in a construction segment;

a passage associated with the body for advancement of a member for positioning about the support element;

a first positioning member secured to the body, the first positioning member movable relative to the body to facilitate positioning an end of the first positioning member relative to a face of the construction segment;

a second positioning member secured to the body, the second positioning member movable relative to the body and independent of the first positioning member to facilitate positioning an end of the second positioning member relative to the face of the construction segment;

a cable extending continuously through the passage and through the first positioning member and through the second positioning member and having opposed cable end segments extending from respective ends of the first positioning member and the second positioning member; and a cable clamp configured for receiving and securing the opposed cable end segments in fixed relation.

2. The safety anchor apparatus according to claim 1 wherein the first and second positioning members each comprise sleeve members.

3. The safety anchor apparatus according to claim 2 including an end plug at least partially positionable within each sleeve member, the end plugs releasable from the sleeve members to enable introduction of the cable through the passage of the body and through the sleeve members.

4. The safety anchor apparatus according to claim 3 wherein the end plugs each define an outer shelf, the outer shelfs configured to engage a face of the support element during movement of the sleeve members to arrange ends of the sleeve members adjacent the face of the support element.

5. The safety anchor apparatus according to claim 1 including a safety fence coupled to the cable.

6. A safety anchor apparatus, which comprises:

a body configured to be positioned about a support element disposed in a construction segment, the body including first and second body end segments;

a passage associated with the body for advancement of a member for positioning about the support element;

first and second positioning members secured to respective first and second body end segments of the body, each of the first and second positioning members mounted for movement relative to the body, each of the first and second positioning members defining a channel, the channels receiving the first and second body end segments of the body and in communication with the passage for reception and passage of the member; and an end plug releasably mountable to the first and second positioning members, the end plugs having plug segments extending outwardly from the first and second positioning members and configured to engage a face of the construction segment during movement of the first and second positioning members relative to the body to facilitate positioning ends of the first and second positioning members relative to the face of the construction segment.

7. The safety anchor apparatus according to claim 6 wherein the end plugs each defines an outer shelf, the outer shelf configured to engage the face of the construction segment to arrange the ends of the respective first and second positioning members adjacent the face of the construction segment.

8. The safety anchor apparatus according to claim 6 including a cable advanceable within the passage of the body when the end plugs are released from the first and second positioning members, the cable being the member.

9. The safety anchor apparatus according to claim 8 comprising a safety fence coupled to the cable.

10. The safety anchor apparatus according to claim 6 wherein the first and second positioning members each comprise sleeve members.

11. The safety anchor apparatus according to claim 10 wherein the sleeve members are mounted about respective first and second body end segments of the body.

12. The safety anchor apparatus according to claim 11 wherein the first and second body end segments of the body each include an outer collar, the outer collar configured to engage an inner ledge of each of the sleeve members to retain the sleeve members on the body.

13. A method, comprising:

coupling a body relative to a support element extending through a construction segment, the body including a first positioning member secured to a first body end segment of the body and a second positioning member secured to a second body end segment of the body;

mounting an end plug to each of the first and second positioning members;

moving the first and second positioning members relative to respective first and second body end segments of the body such that the end plugs engage a face of the construction segment to thereby position ends of respective first and second positioning members relative to the face of the construction segment;

removing the end plugs from the first and second positioning members;

subsequent to removing the end plugs, advancing a member through the first and second positioning members and through a passage associated with the body whereby end segments of the member respectively extend from the ends of the first and second positioning members; and securing the end segments of the member relative to an object.

14. A method, comprising:

coupling a body relative to a support element extending through a construction segment, the body having a first sleeve member secured to a first body end segment of the body and a second sleeve member secured to a second body end segment of the body;

moving the first and second sleeve members relative to respective first and second body end segments of the body to facilitate positioning ends of respective first and second positioning members relative to a face of the construction segment;

advancing a cable through a passage associated with the body and continuing through sleeve passages of the first and second sleeve members such that first and second cable end segments of the cable respectively extend from the first and second sleeve members;

coupling a second body about a second support element disposed in a second construction segment, the second construction segment being spaced from the first-mentioned construction segment;

extending the first cable end segment of the cable to the second construction segment;

passing the first cable end segment of the cable through a passage of the second body; and securing the first and second cable end segments relative to each other; and securing the first cable end segment of the cable extending from the second body to itself to thereby create a safety fence line extending between the first and second construction segments.

* * * * *